United States Patent [19]

Bergmann et al.

[11] 4,063,677
[45] Dec. 20, 1977

[54] METHOD OF WELDING MEMBERS TOGETHER

[75] Inventors: Werner J. Bergmann, Lower Burrell, Pa.; John A. Worden, Hope, Ind.

[73] Assignee: Aluminum Company of America, Alcoa Center, Pa.

[21] Appl. No.: 714,124

[22] Filed: Aug. 13, 1976

Related U.S. Application Data

[63] Continuation-in-part of Ser. No. 529,903, Dec. 5, 1974, Pat. No. 3,974,955.

[51] Int. Cl.² ............................................. B23K 28/00
[52] U.S. Cl. .................................... 228/242; 228/205; 228/256; 164/86
[58] Field of Search ........................ 228/205, 256, 242; 164/5, 86, 108, 133, 136

[56] References Cited

U.S. PATENT DOCUMENTS

| | | | |
|---|---|---|---|
| 3,164,896 | 1/1965 | Fullman | 164/86 X |
| 3,701,380 | 10/1972 | Richter et al. | 164/86 X |
| 3,860,062 | 1/1975 | McMurray et al. | 164/108 X |
| 3,974,955 | 8/1976 | Bergmann et al. | 228/256 |

Primary Examiner—James L. Jones, Jr.
Assistant Examiner—K. J. Ramsey
Attorney, Agent, or Firm—Teare, Teare & Sammon

[57] ABSTRACT

A method of welding together two members placed with the edge surfaces to be joined in mutually facing relationship and separated by a weld gap. A weld material is endothermically heated to a molten state and flowed through the weld gap for heating the members to cause melting of the edge surfaces with the weld metal flow being continued for a time sufficient to provide a ratio of weld gap metal to total metal flowed of at least 1:50, and then the flow is terminated to provide for weld solidification.

10 Claims, 10 Drawing Figures

METHOD OF WELDING MEMBERS TOGETHER

This application is a continuation-in-part application of Ser. No. 529,903 filed Dec. 5, 1974 to Bergmann et al., now U.S. Pat. No. 3,974,955, granted Aug. 17, 1976.

BACKGROUND OF THE INVENTION

The present invention relates to a process for welding two members, such as metallic plate sections together, and more particularly relates to a method which employs the use of endothermic heating of a charged metal and then obtaining the necessary heat input to the edge surfaces to be welded by flowing the molten weld metal past the edge surfaces at a predetermined rate sufficient to provide a selective ratio of weld gap metal to total metal flowed to provide an efficient process with satisfactory weld quality.

In the Bergmann et al. patent, as in the present invention, the metal flow serves two purposes. One being to provide weld metal, and the other being to provide heat for melting the members to be joined. Hence, a fundamental characteristic of the present invention is that the melting of members (parent metal) to be joined is obtained by the heat input from the flow of molten weld metal. In other words, the present invention is characterized by the fact that a majority of the metal flow is for the purpose of introducing heat necessary to melt the members to be welded, rather than for the purpose of providing the weld metal in a finished weld. Hence, in the present invention, excess metal continues to flow to the weld gap and out through side dams for subsequent usage or for recycling, as desired.

In the present invention, a primary measure of the efficiency of the process is the amount of metal flowed through the weld joint during the joining cycle. The most efficient process utilizes a minimum amount of weld (filler) material consistent with satisfactory weld quality. Several parameters which influence the amount of metal circulated through the weld joint include metal temperature, spacing between the members and the input area. The temperature of the metal stream is an important element, as it directly affects the amount of metal circulated to the weld joint to achieve bonding. High melt temperatures allow faster joining rates. As the metal temperatures are lowered, more metal is required for circulation through the weld joint to achieve bonding. However, because high metal temperatures result in increased absorption of hydrogen gas, an optimum metal temperature exists for each set of joining parameters. In the invention, it has been found that minimum temperatures should be employed consistent with satisfactory joining rates, internal quality and optimum metal circulation rates. The spacing between the members influences the amount of metal flowing between the members much as in an orifice. Melting, which occurs along the weld interface, constantly enlarges the area between the members dependent on heat flow considerations and the rate of joining. Thus, after a steady state is achieved, the original spacing between the members is enlarged and a "new area" is generated by molten metal. This "new area" will control the amount of metal that passes through the gap between the members. The metal-inlet area provided by the side dams has a regulating effect on the amount of metal passed through the system since it determines the shape and size of the metal stream which flows through the weld gap and impinges along the weld interface. By controlling the inlet area, the flow rate of metal through the weld gap will be determined and the melt rate along the interface established. The velocity of the metal stream flowing along the weld interface determines the melting rate and penetration into the parent metal. In the present invention, the metal flow is preferably horizontal. Thus, the "mass" flow velocity cannot be greatly changed except by spacing between the members to be joined.

By the present invention, there is provided advantages over the prior exothermic methods which required measured amounts of exothermic reactants as noted in respect to Deppeler U.S. Pat. No. 1,795,332. In the present invention, relatively cool (as compared to Thermit temperatures) weld material is flowed through the weld gap until edge melting is initiated, whereupon, the flow is terminated to provide for weld solidification. This obviates the need to provide measured amounts of thermit materials.

The recently issued U.S. Pat. No. 3,860,062 is somewhat like Deppeler in that it discloses a portable furnace disposed above a mold for the purpose of cast welding a pair of conductors confined within the mold.

SUMMARY OF THE INVENTION

The present invention relates to a method for welding together two members, such as aluminum plates or the like, disposed with the edge surfaces to be joined in mutually facing relationship and separated by a weld gap. A weld (filler) metal is endothermically heated to a molten state and flowed through the weld gap between the edge surfaces for heating the members with the molten weld metal to cause melting of the edge surfaces. The weld metal flow is continued for a time sufficient to provide a ratio of weld gap metal to total flowed metal of at least 1:50. The flow of molten weld metal is then terminated to provide for weld solidification.

DESCRIPTION OF THE PREFERRED EMBODIMENT

Figure 1:
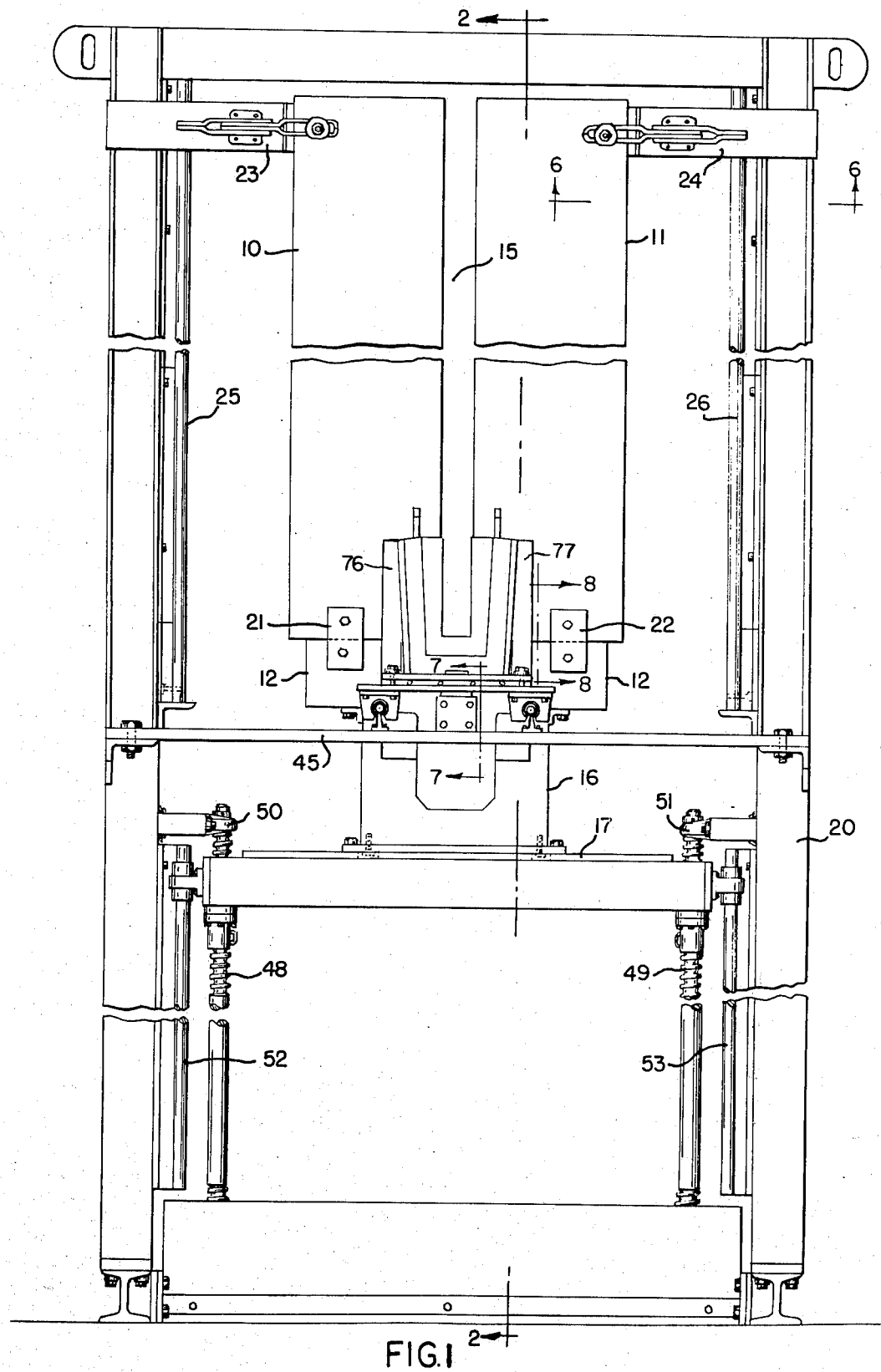
FIG. 1 is an end view of an apparatus for carrying out of the method of the present invention.

An apparatus for carrying out the present invention is illustrated in the drawings, wherein the members, such as heavy section plates to be welded, are indicated at 10 and 11 respectively, in FIG. 1, as being supported upon a starting block 12 in spaced relationship vertically to form a gap 15 along which the welded seam is to be made. The starting block may be supported by a standard 16 which is attached to a carriage 17, the latter of which is movable vertically within a stationary frame 20. The plates may be held in vertical position by a set of lower clamps 21 and 22 and a set of upper clamps 23 and 24. The lower clamps are fastened to the starting block 12, while the upper clamps are movable vertically along guide rails 25 and 26, respectively.

The seam or weld between the plates 10 and 11 is formed by causing a moving current of molten to flow horizontally through the gap 15, starting at the bottom of the gap and then by moving the plates downwardly and simultaneously as the weld metal fills the gap, until the entire seam opening is filled with metal. To contain the molten metal within the gap at the start of the operation, the starting block 12 bridges the gap between the plates and supports the molten metal at the start of the welding operation.

Figure 2:
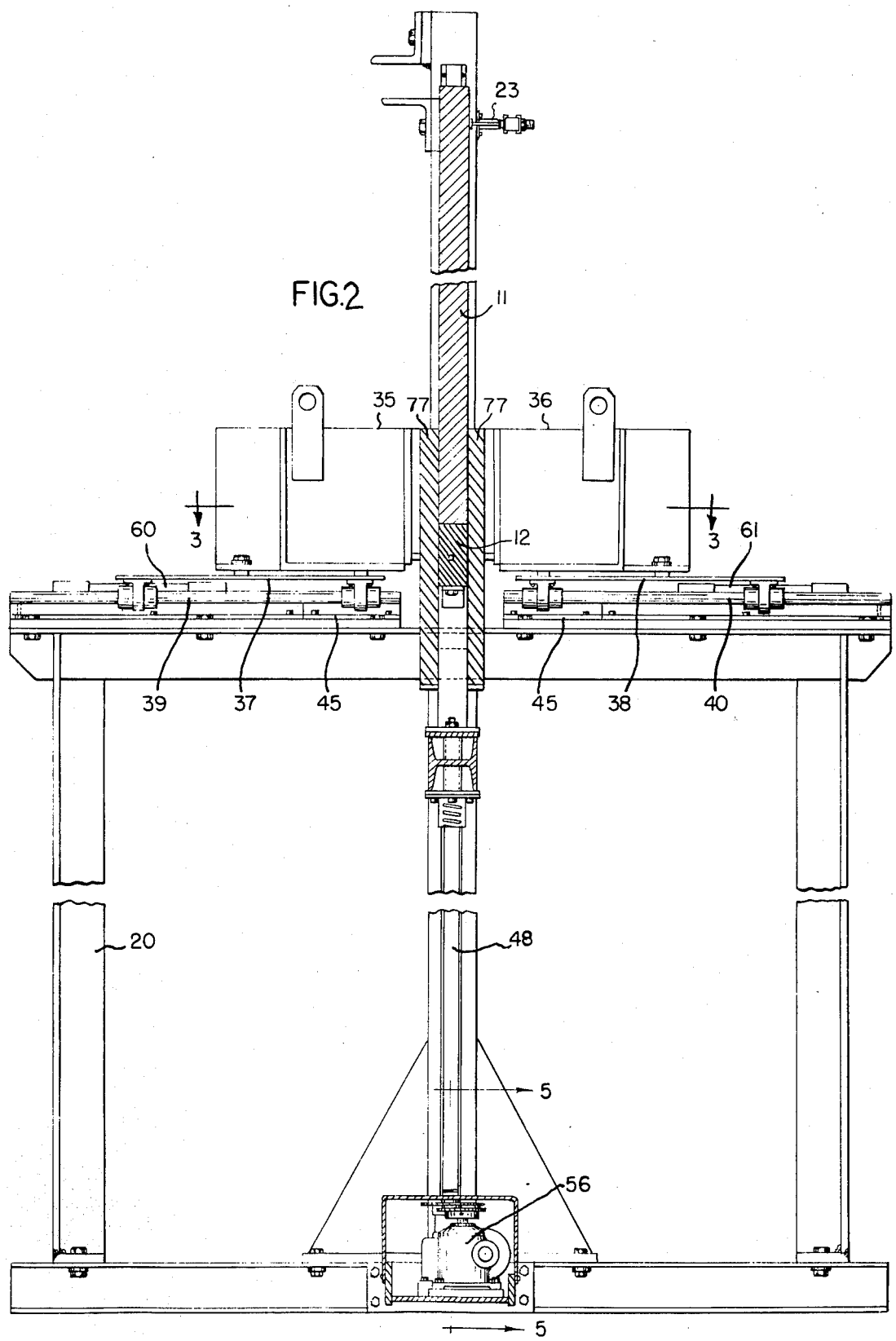
FIG. 2 is a vertical section taken on a plane indicated by the line 2—2 in FIG. 1.

Metal, which has been endothermically heated to a molten state, is introduced into the gap through an inlet trough 35 from a source of molten metal such as a crucible, in a furnace, while the excess metal is discharged through a trough 36. The bottom surfaces of the troughs engaged by the flowing metal are substantially in the same plane as the top surface of the block 12 at start-up. The troughs are shown as being mounted upon carriages 37 and 38, respectively (FIG. 2), each of which is movably mounted upon spaced parallel guide bars 39 and 40 respectively, the latter of which are supported upon spaced cross beams 45 which are carried by the frame 20.

The term "endothermic" or "endothermically" as used herein means the heating of a charge of welding material in a crucible, using a source of heat external to the charge, until the charge is melted, and then, with the charge molten, flowing it between the members to be joined. The necessary heat input to the edge surfaces of the members to be welded is obtained simply by flowing the molten charge past the edge surfaces at a sufficient rate. It has been found that a suitable molten metal flow velocity through the gap is about 1.5 feet per second.

Figure 5:
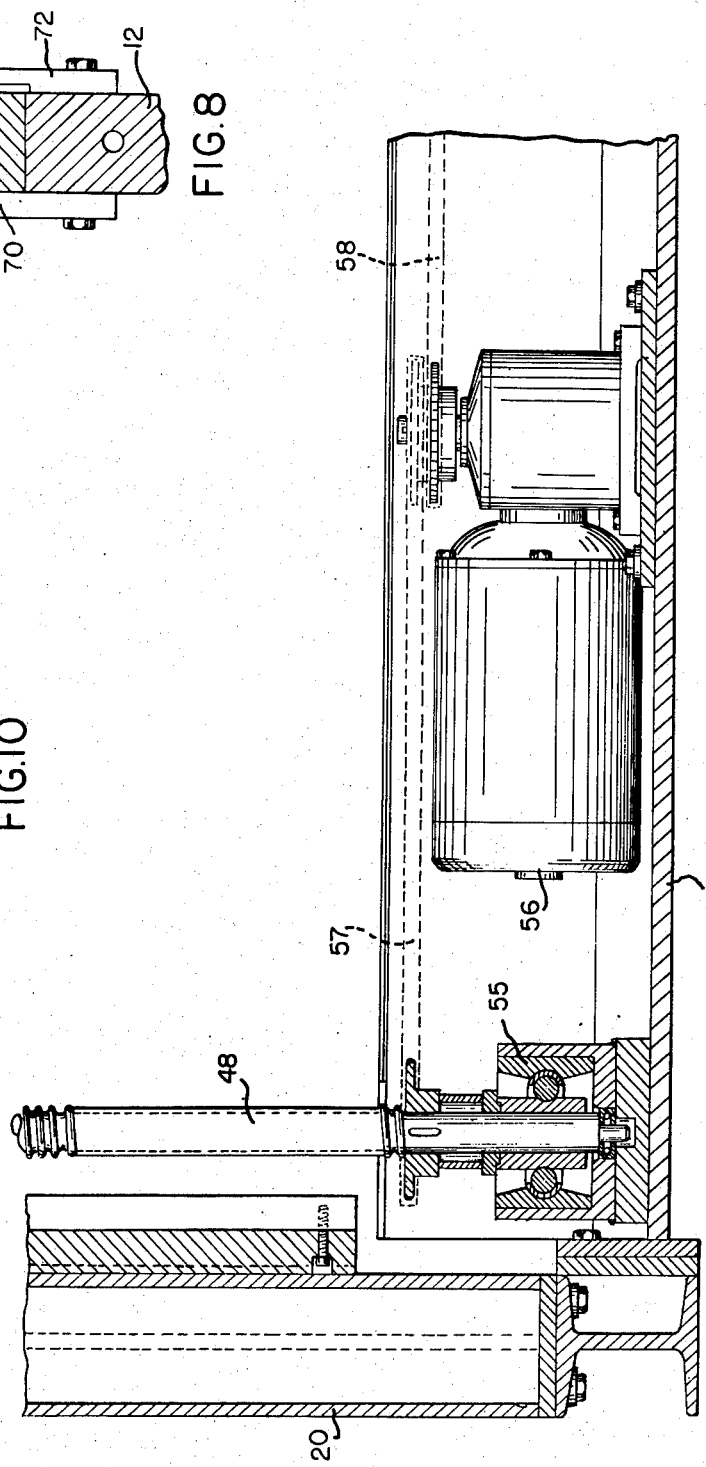
FIG. 5 is a section taken on a plane indicated by the line 5—5 in FIG. 2, but on a larger scale.

To move the carriage 17 vertically with reference to the frame 20, the carriage may have threaded apertures adjacent the ends thereof through which threaded shafts 48 and 49 extend. The shafts are journaled at the upper ends in bearings 50 and 51 respectively, and the carriage is guided in such vertical movement by guide bars 52 and 53, respectively. The lower ends of the shafts are journaled in bearings, such as that indicated at 55 in FIG. 5. An electric motor 56 which is mounted on the base 59 of the frame may be connected to the respective shafts by sprocket chains 57 and 58, respectively.

Figure 7:
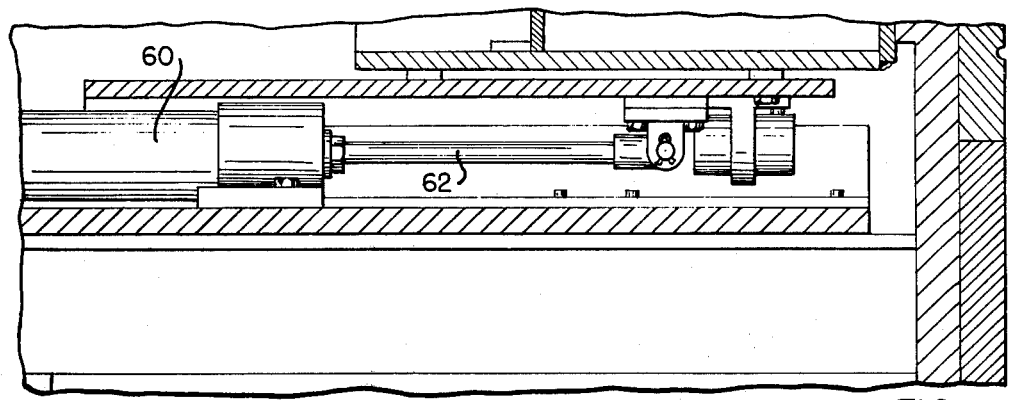

The troughs may be moved toward and away from each other with respect to the frame 20 so as to accommodate plates of various thickness which are to be welded and to maintain proper contact with the plates. The motive power for moving the troughs may comprise air cylinders 60 and 61 (FIG. 2) which are mounted on the frame and are operatively connected to the troughs 35 and 36, respectively, by piston rods 62 with only one shown in FIG. 7.

To restrain the flow of molten metal laterally, adjacent the faces of the plates to be joined, the end of each trough terminates in side dams, indicated in general at 75, each of which has wings 76 and 77 adapted to engage the faces of the respective plates to be welded. Each side dam may be resiliently adjustable, as at 78, with reference to the plates so as to assure a sliding contact between the wings thereof and the faces of the metal plates as the plates are moved downwardly during the welding operation. If desired, the pressure exerted against the piston rods 62 may be adjusted and maintained so as to hold the troughs and also the side dams in proper position for preventing the lateral escape of molten metal during the welding operation.

The side dams are useful in obtaining a satisfactory surface quality on the exterior of the weld. The dams affect the solidification rate along the length of the weld, and because of the sliding friction between the weld surfaces and the side dams, lubrication is desirable between them and the parent material to prevent seizing between the side dams and the plates, and to prevent a tearing of hot, and thus soft, weld metal out of the weld zone. The side dams have been constructed of graphite (Union Carbide Company grades ATJ and CS), from water-cooled Mechanite, and from water-cooled copper. Water-cooled aluminum is another example. The best weld surface appearance has been produced by using grade ATJ graphite side dams. The vertical dimension of the side dams along the weld gap is correlated, in the method of the invention, with the rate at which the plates are moved relatively downwards. By this arrangement, the lower edge of the side dams will always be below the weld metal solidification interface which forms in the weld gap 15 as the plates are moved downwards to move new portions of the weld gap far enough away from the heat-input zone of horizontally flowing metal that solidification can occur.

Figure 8:
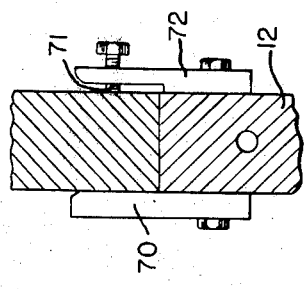
FIGS. 6, 7 and 8 are sections taken on planes indicated by the corresponding numbered lines in FIG. 1.
Figure 6:
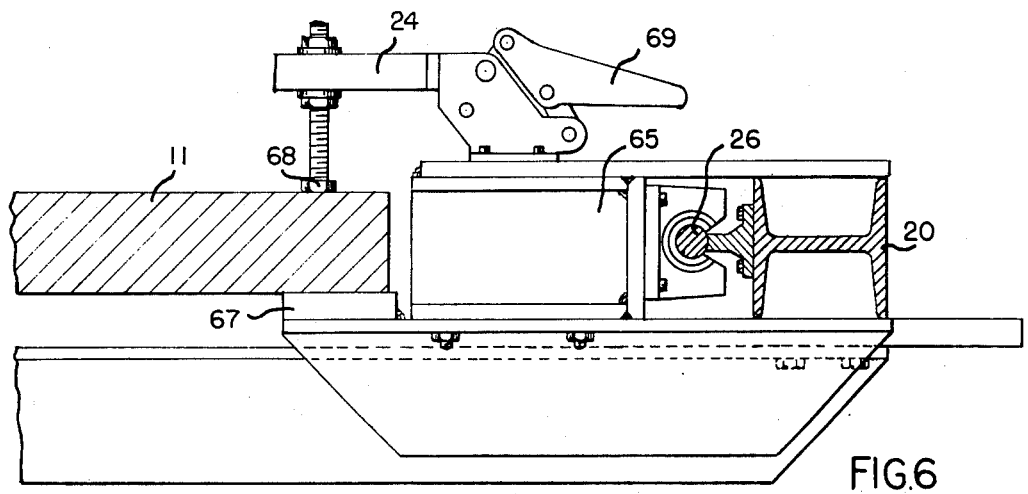

In FIG. 6, the upper clamping member 24 is shown as being mounted on a carriage 65 which is guided on the vertical bar 26 and which carries a stationary jaw 67 and the movable jaw 68. The stationary jaw engages one side of the plate to be welded, and the movable jaw engages the other side of the plate and is provided with a quick-opening, hand acutated lever 69. The lower clamp is shown in FIG. 8 as comprising a stationary jaw 70, which is attached to the supporting block 12 and a movable jaw 71 which is carried adjustably by an arm 72, the latter of which is attached to the side of the supporting block.

Figure 3:
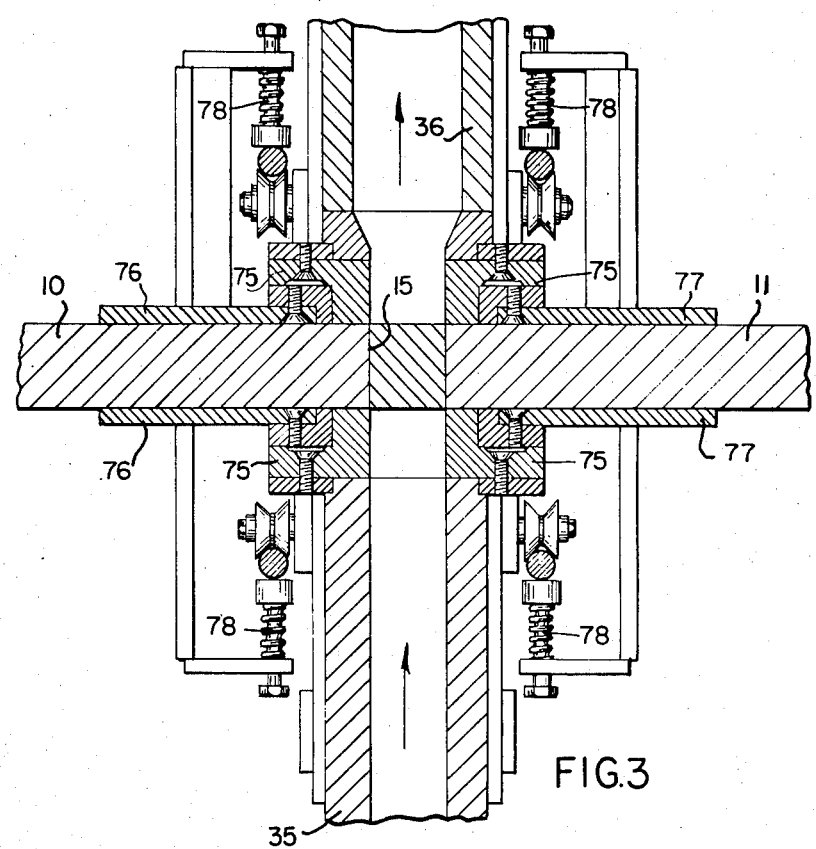
FIG. 3 is a horizontal section taken on a plane indicated by the line 3—3 of FIG. 2.
Figure 4:
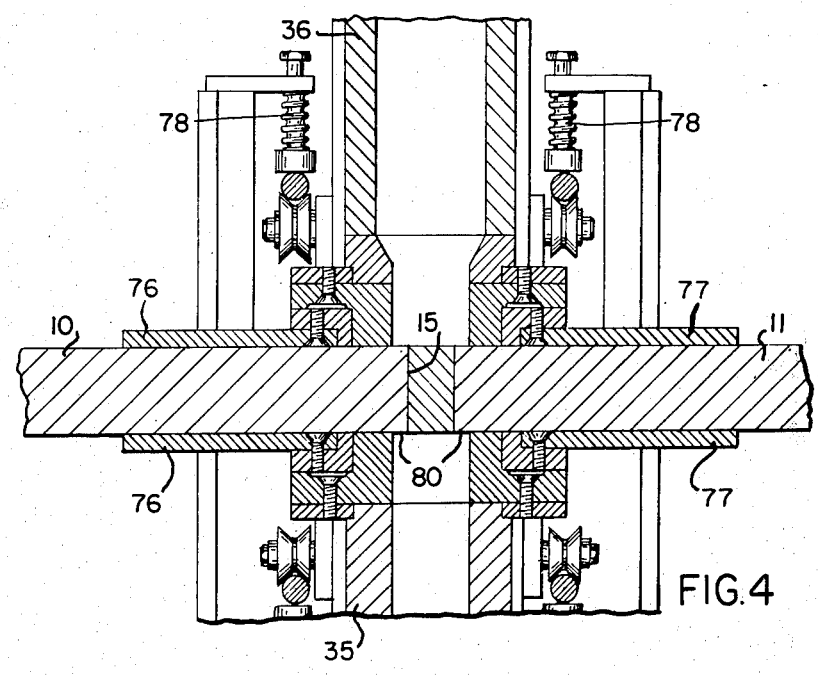
FIG. 4 is a section similar to that of FIG. 3 but showing a modified form of the seam configuration between the plates to be welded.
Figure 10:
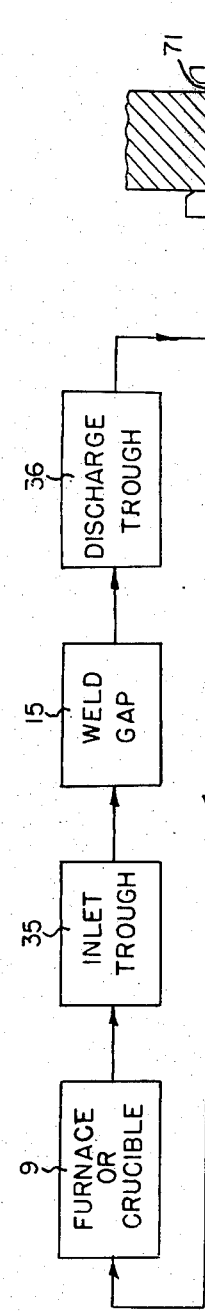
FIG. 10 is a diagram showing the flow of metal from the source of supply to the weld gap and back to the source of supply.

In FIG. 3 the spacing between the wings 76 and 77 of the side dam is equal to the width of the gap 15 between the plates. In FIG. 4, however, the width of the gap 15 is smaller than the spacing between the wings of the side dams, thereby providing an overhang, indicated at 80, of the plates with respect to the opening through which the molten metal flows. Thus, for example, if the gap 15 is ½ inch and the distance between the side dams is 1 inch, then the plate overhang 80 would be ¼ inch. FIG. 10 illustrates the concept of saving heat in the present invention by recycling metal, which has already flowed through the gap 15, back to flow through the gap again.

Figure 9:
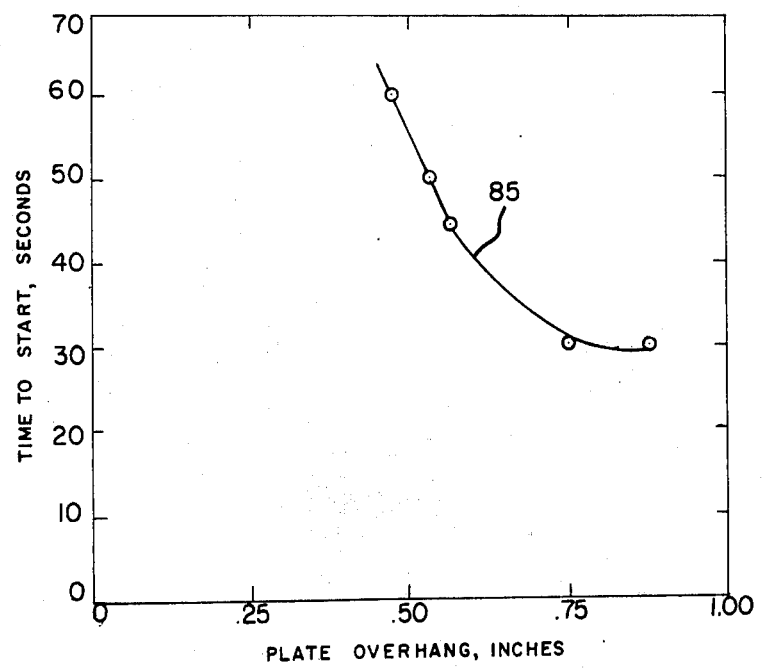
FIG. 9 is a chart showing the relationship between the plate overhang in inches and the time in seconds of metal circulation through the plate gap before the plate movement is initiated.

There is a relationship between the extent of the plate overhang and the time during which the metal flows through the gap between the plates before the downward movement of the plates is initiated. Such delay allows the molten metal to heat the opposing edges of the plates until they are melted and are at a temperature that will provide a satisfactory weld between the weld metal and the plates. In FIG. 9 such relationship is illustrated in a chart wherein the extent of the plate overhang is plotted against the time of metal flow from the commencement of the flow to the start of the downward movement of the plates. In such chart, the plate overhang is expressed in fractions of an inch while the time to start is expressed in seconds. On such chart the curve 85 represents the results of an experimental determination which shows that quicker melting occurs with the larger overhang. The importance of such phenomenon is related to the fact that, with faster initial melting, less metal is required to be circulated through the welding zone, thereby resulting in a saving in the amount of metal used in the process.

A further important feature of the plate overhang is that it affects the uniformity of lateral penetration with respect to the center line of the weld. Thus, if one of the weld plates overhangs more than the other, the welding or filler metal will penetrate excessively on one side of the weld. This reduces the local metal velocity against the opposing plate surface and can result in lack of edge surface fusion and failure to form a welded bond. In the preferred embodiment, the plate overhang should be adjusted to within plus or minus 1/16 inch between the two plates. The data appearing on the chart FIG. 9 was obtained with a plate gap of 0.375 inch between aluminum plates each being 2.75 inch thickness and with a metal inlet area of 3.28 sq. inches. The composition of the plates was that which is known in the art as 5083 aluminum-magnesium alloy and the composition of the filler or welding metal was that which is known in the art as 5083 filler metal.

The joining rate achieved with the process of the invention is controlled by the metal temperature, the metal inlet area and the spacing between the plates. It has been found that with a given metal temperature two extremes exist with regard to the joining rate. Thus, at a temperature of 1,540° F, using a metal inlet area of 3.28 sq. inches and a plate thickness of 2.75 inches, the joining rate for a gap of 0.75 inches between the plates is 5 inches per minute, whereas at the same temperature with a gap of 1 inch, the joining rate is 4.5 inches per minute. In general, if too slow a joining rate is used with a given metal temperature, excessive penetration into the parent metal will occur, and if the lateral weld penetration becomes excessive, melting will occur behind the side dams and bleed-out will occur. On the other hand, if too fast a joining rate occurs for a given metal temperature, then bonding will not occur on one or both plates.

The shape of the channel, or gap, between the plates to be welded affects the initiation of the melting as well as the final shape of the weld zone. This condition appears to be related to the orifice effect produced between the two plate sections. For example, a convergent channel appears to begin melting before a straight-sided channel or a divergent channel. A divergent channel requires a longer initial circulation time through the weld zone before the commencement of the melting. Generally, slower joining rates are achieved with a divergent channel than with either a straight-sided or convergent channel. The straight-sided channel, however, is less costly to prepare. While the molten metal is in the crucible, it may be conventionally fluxed with chlorine for the removal of hydrogen. Additionally, the molten metal may be treated while it is flowing in the stream from the crucible to the plates to be welded, by diffusing inert gas, such as argon, or active gas, such as chlorine, into the stream. Suitable techniques of introducing the gas into the molten metal are set forth in U.S. Pat. Nos. 3,039,864 and in 3,839,019.

EXAMPLE I

Aluminum alloy type 5083 plates each having a thickness of 2¾ inches, a width of 6 inches, and a length of 24 inches were welded together using the method and apparatus of the present invention. The surfaces to be welded were provided with a 6° convergent taper so that the weld gap became narrower in the direction of weld metal flow. On the outlet side of the gap, the spacing between the plates was ⅜ inch. The temperature of the weld metal on the inlet side of the weld was 1,540° F, and the weld metal used was aluminum alloy type 5083. The plate overhang was about 9/32 inch and the flow rate of the aluminum welding metal through the weld gap was 3,810 lbs. per hour. The metal flowed for about 20 seconds until melting of the parent metal could be sensed across the weld gap by using an iron probe. The lowering mechanism was started after such 20 second period, and the plates were pulled downwardly simultaneously between the side dams at a velocity of 3½ inches per minute. During such operation, the metal stream substantially filled the port on the inlet side of the dam. The inlet dimensions of such port were 1¾ inches in height for the sides, and 1⅞ inches across for the bottom lip. The ratio of weld metal to total metal was found to be 1:104 and a satisfactory weld joint was obtained.

EXAMPLE II

In Example II, the same plate dimensions and type of plate were used as in Example I, but the surfaces to be welded had a straight gap with the spacing of ⅜ inch on both the inlet and outlet sides of the gap. The temperature of the weld metal on the inlet side of the weld was 1,460° F, and the plate overhang was about ¾ inch. The flow rate of the welding metal through the gap was about 4,000 lbs. per hour, and in about 30 seconds of pre-welding pouring time the melting of the parent metal could be sensed across the weld gap by the use of an iron probe. The plates were moved downwardly at a velocity of about 3 inches per minute to give a total time of 8.5 min. During this time, 564 lbs. of metal flowed through the weld joint or zone to give a ratio of weld metal to total metal of 1.228. The resulting weld joint was satisfactory. The tensile strength, an important measure of weld quality in thick plate applications, of the joint was 36,000 lbs. per square inch. The longitudinal axis of the tensile specimens was, with respect to FIG. 1, horizontal and parallel to the plane of the figure.

EXAMPLE III

In Example III, aluminum alloy type 5083-0 plates each having a thickness of 2¾ inches, a width of 12 inches, and a length of 48 inches were welded together, using the method and apparatus of the present invention. The surfaces to be welded were provided with a straight channel, and the gap between the plates was ½ inch. The temperature of the weld metal in the crucible of the furnace was between 1,450° F and 1,510° F, and there was about 5000 pounds of metal in the crucible at the start of welding. The temperature of the metal at the inlet side of the gap was between 1410° F and 1460° F, and the temperature of the metal at the outlet side of the gap was between 1310° F and 1360° F, and the weld metal used was aluminum alloy type 5183. The side dams were made of graphite and the bottom plate comprised water cooled Meehanite. The time of starting the plates downwardly was 10 seconds after the metal started to flow through the gap, and the joining rate was between 2.75° per min., and 3.0 inch per min. The welding time was 8 min. 21 seconds. The ratio of weld metal to total metal was found to be 1:270. The plate overhang was ¼ inch, and the inlet port was 1 inch wide and 7.5 inch high. In this example, the metal was fluxed for ½ hour in the furnace crucible by letting a slow bubbling of chlorine rise through the melt from a submerged lance, then treated with an argon flow rate of 90 standard cubinc feet per hour (SCFH) in a device as pictured in FIG. 1 of U.S. Pat. No. 3,039,864 issued June 19, 1962 in the name of P. D. Hess et al., and finally treated with a mixture of argon gas and chlorine gas, at a flow rate of, respectively, 100 SCFH and 2 SCFH in a device as pictured in FIG. 1 of U.S. Pat. No. 3,839,019 issued Oct. 1, 1974 in the name of M. J. Bruno et al.

EXAMPLE IV

Aluminum alloy type 5083-0 plates, each having a thickness of 2.75 inches, a width of 12 inches, and a length of 48 inches, were welded together using the method and apparatus of the present invention. The surfaces to be welded were spaced apart so as to form a ½ inch gap. The temperature of the weld metal on the inlet side was about 1390° F, and the temperature on the outlet side of the gap was between 1310° F and 1320° F. The temperature of the metal in the crucible of the furnace was between 1450° F and 1460° F, and the weld metal used was aluminum alloy type 5085. The plate overhang was 1¼ inches. The side dam comprised grade CS graphite, and the bottom plate was water cooled Meehanite. The weld area was ½ inch × 2.75 inches, and the joining rate was 2.75 inches per minute. The time between the start of the metal flow and the start of the downward movement of the plates was 12 seconds. The ratio of weld metal to total metal was found to be 1:280. The metal in the crucible was fluxed with chlorine for ½ hour, and the metal in the stream after leaving the crucible was fluxed with argon gas at the rate of 90 SCFH in the device of U.S. Pat. No. 3,039,864 as mentioned above. Six specimens of welds produced in this example averaged 39,450 lbs. per sq. inch tensile strength, and the welds were satisfactory.

EXAMPLE V

Aluminum alloy type 5083 plates each having a thickness of 2¾ inches, a width of 6 inches, and a length of 24 inches were welded together using the method and apparatus of the present invention. The surfaces to be welded were provided with a 10° convergent taper so that the weld gap became narrower in the direction of weld metal flow. On the outlet side of the gap, the spacing between the plates was ⅜ inch. The temperature of the weld metal on the inlet side of the weld was 1,540° F, and the weld metal used was aluminum alloy type 5083. the plate overhang was about 9/32 inch and the flow rate of the aluminum welding metal through the weld gap was 3,810 lbs. per hour. The metal flowed for about 20 seconds until melting of the parent metal could be sensed across the weld gap by using an iron probe. The lowering mechanism was started after such 20 second period, and the plates were pulled downwardly simultaneously between the side dams at a velocity of 3¼ inches per minute. During such operation, the metal stream substantially filled the port on the inlet side of the dam. The inlet dimensions of such port were 1¾ inches in height for the sides, and 1⅛ inches across for the bottom lip. The ratio of weld metal to total metal being found to be 1:80.

In the foregoing examples, the ratio of weld metal to total metal was calculated on the flow rate through the weld gap 15. For instance, in Example II, 564 pounds of metal flowed through the gap 15, since the measured flow rate was 4,000 lbs./hour. Therefore, the ratio of weld metal to total metal was calculated upon 2.48 divided by 564 pounds to provide the ratio 1:228. Accordingly, for flow rates between 3800 lbs. per hour and 4,000 lbs. per hour, at weld metal inlet temperatures between 1390° F and 1540° F, the ratio of weld metal to total metal is in the range between 1:80 to 1:280. Moreover, the ratio should be at least 1:50, and preferably at least 1:100. In the invention, a ratio of at least 1:200 is most preferable.

While the specific disclosure above relates particularly to the welding of plates, Hall-Heroult alumina electrolysis cell bus bars, or rods in general, may also be welded according to the invention. Also, the particular references to thick plate is made, because that is the most difficult application of the invention, so that the invention is applicable to thin plate or sheet as well. Preferred applications of the invention are for welding aluminum, plastics, copper, and other similarly low-melting metals, alloys and materials.

We claim:

1. A method of welding together two members placed with the edge surfaces to be joined in mutually facing relationship and separated by a weld gap, comprising endothermically heating a metal to a molten state, flowing the molten metal through the weld gap between the edge surfaces for heating the members with the molten metal to cause melting of the edge surfaces, continuing to flow the molten metal for a time sufficient to provide a ratio of weld gap metal to total metal flowed of at least 1:50, and then terminating the flow of molten metal to provide for weld metal solidification in said weld gap.

2. A method in accordance with claim 1, wherein said ratio of weld gap metal to a total metal flowed within the range between 1:80 to 1:280.

3. A method in accordance with claim 1, wherein said ratio of weld gap metal to total metal flowed is at least 1:200.

4. A method in accordance with claim 1, wherein said members comprise aluminum plates having a thickness of approximately 2.75 inches.

5. A method in accordance with claim 1, wherein said molten metal has a temperature upon introduction into said weld gap in excess of 1300° F and a flow rate between 3800 pounds per hour and 4,000 pounds per hour.

6. A method in accordance with claim 1, wherein the molten flows through the weld gap at a rate of about 1.5 feet per second.

7. A method in accordance with claim 1, wherein said weld solidification is provided by terminating the flow of molten metal by relatively moving a weld metal solidification interface continuously downwardly away from the flow path of said molten metal into said weld gap.

8. A method in accordance with claim 1, including simultaneously moving said members downwardly while continuing the flow of said molten through said weld gap until the latter is substantially filled with weld metal.

9. A method for welding together two members, such as metallic plates or the like, disposed with their edge surfaces to be joined in mutually facing relationship and laterally separated by a weld gap comprising,
   orienting said members so that said gap extends in a generally vertical direction in relation to the flow of molten weld metal with the gap having a width generally corresponding to the width of the weld joined to be formed,
   endothermically heating a metallic weld material to a molten condition,
   flowing the molten weld metal generally horizontally through said gap from one side to the other at a rate sufficient to melt said edge surfaces for welding,
   continuing the flow of molten weld metal for a time sufficient to provide a ratio of weld gap metal to total metal flowed of at least 1:50 and,
   terminating the flow of molten metal to provide for weld solidification by relatively moving a weld material solidification interface continuously downwardly away from the general flow path of the molten weld metal.

10. A method in accordance with claim 9,
   said weld gap has a spacing of 0.375 inches and with the joining rate being approximately 3.5 inches per minute at approximately 1,500° F.

UNITED STATES PATENT OFFICE
CERTIFICATE OF CORRECTION

Patent No. 4,063,677  Dated December 20, 1977

Inventor(s) Werner J. Bergmann et al.

It is certified that error appears in the above-identified patent and that said Letters Patent are hereby corrected as shown below:

The term of this patent subsequent to August 17, 1993 has been disclaimed.

Signed and Sealed this

Eighteenth Day of April 1978

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,063,677      Dated December 20, 1977

Inventor(s) Werner J. Bergmann and John A. Worden

It is certified that error appears in the above-identified patent and that said Letters Patent are hereby corrected as shown below:

Column 3, Line 11, after "molten" add --metal--.

Column 4, Line 19, change "Mechanite" to --Meechanite--.

Column 7, Line 10, change "cubinc" to --cubic--.

Column 8, Line 58, after "molten" add --metal--.

Column 8, Line 68, after "molten" add --metal--.

Signed and Sealed this

*Twenty-seventh* Day of *June 1978*

[SEAL]

Attest:

RUTH C. MASON
*Attesting Officer*

DONALD W. BANNER
*Commissioner of Patents and Trademarks*